(12) United States Patent
Chu et al.

(10) Patent No.: US 7,518,888 B2
(45) Date of Patent: Apr. 14, 2009

(54) CONTROL CIRCUIT AND METHOD FOR A FLY-BACK VOLTAGE CONVERTER

(75) Inventors: Kwan-Jen Chu, Hsinchu (TW); Chung-Lung Pai, Hsinchu (TW); Yuan-Huang Cheng, Pingdung (TW); Jing-Meng Liu, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 0 days.

(21) Appl. No.: 11/415,223

(22) Filed: May 2, 2006

(65) Prior Publication Data

US 2006/0250827 A1    Nov. 9, 2006

(30) Foreign Application Priority Data

May 4, 2005    (TW) .............................. 94114454 A

(51) Int. Cl.
H02M 3/335    (2006.01)
H02M 7/04    (2006.01)

(52) U.S. Cl. ..................... 363/21.12; 363/21.14; 363/89

(58) Field of Classification Search .............. 363/21.12, 363/21.13, 89, 127, 21.04, 21.14, 21.18, 363/21.02
See application file for complete search history.

(56) References Cited

U.S. PATENT DOCUMENTS 3,979,661 A * 9/1976 Matz ........................... 363/89
5,663,874 A * 9/1997 Mader et al. .............. 363/21.14
5,844,786 A * 12/1998 Yoshida et al. ........... 363/21.01
6,026,005 A * 2/2000 Abdoulin ...................... 363/89
7,161,814 B2 * 1/2007 Uchida ..................... 363/21.12
7,330,359 B2 * 2/2008 Uematsu ................... 363/21.12
2004/0062061 A1 * 4/2004 Bourdillon et al. ........ 363/21.12
2004/0125621 A1 * 7/2004 Yang et al. ................ 363/21.14
2005/0237032 A1 * 10/2005 Tan et al. ..................... 320/166

* cited by examiner

Primary Examiner—Akm E Ullah
Assistant Examiner—M'Baye Diao

(57)    ABSTRACT

In a fly-back voltage converter that includes a transformer to transform a primary current to a secondary current and a switch serially coupled to the primary winding to switch the primary current in response to a control signal, a detection signal is produced by comparing the secondary current with two threshold values after the primary current is switched off to trigger the next on-time cycle of the switch. Once the secondary current is detected to be greater than a first threshold value, it is determined that the secondary current has been switched on, and until the secondary current is detected to be lower than a second threshold value, it is determined that the secondary current is to be switched off. The hysteresis range of the threshold values prevents error detection of the secondary current.

8 Claims, 9 Drawing Sheets

CONTROL CIRCUIT AND METHOD FOR A FLY-BACK VOLTAGE CONVERTER

FIELD OF THE INVENTION

The present invention is related generally to a voltage converter and, more particularly, to a fly-back voltage converter.

BACKGROUND OF THE INVENTION

A fly-back or switch-back voltage converter is a circuit to step up a voltage or to step down a voltage. For further illustration, FIG. 1 shows a circuit diagram of a typical fly-back voltage converter 10, which comprises a transformer 12 having a primary winding L1 coupled between an input voltage Vin and a switch M and a secondary winding L2 coupled between a capacitor Co and a controller chip 14. The controller chip 14 has an output pin EXT to provide a control signal S1 to switch the switch M, so as to transform a primary current Ip in the primary winding L1 into a secondary current Is in the secondary winding L2 to charge the capacitor Co to thereby produce an output voltage Vout, and a detection pin MCD coupled to the secondary winding L2 to detect the secondary current Is in order to control the off-time of the switch M. The converter 10 employs a control of constant on-time (regulated peak-current) and minimum-current detection. FIG. 2 is a waveform diagram to illustrate the control signal S1, primary current Ip and secondary current Is when the converter 10 ideally operates, in which waveform 20 represents the control signal S1, waveform 22 represents the primary current Ip, and waveform 24 represents the secondary current Is. Ideally, at the moment, for example time T2 in FIG. 2, that the primary current Ip in the primary winding L1 is switched off, the secondary current Is is immediately switched on in the secondary winding L2 to charge the capacitor Co. However, as shown in FIG. 3, noises 34 are actually introduced into the primary current Ip and secondary current Is when the primary current Ip and secondary current Is are switched on and off, because of the ringing effect of the primary current Ip and secondary current Is and the transferring delay resulted from the parasitic capacitor Cp between the primary winding L1 and secondary winding L2, and therefore error operations may occur in the converter 10. For an example, FIG. 4 shows a waveform diagram when noises induce error operations in the converter 10, in which waveform 40 represents the control signal S1, waveform 42 represents the primary current Ip, and waveform 44 represents the secondary current Is. After the primary current Ip is switched off and before the secondary current Is is switched on, noises 46 and 48 each completes a full waveform, causing the control circuit in the controller chip 14 to misjudge that the secondary current Is has charged the capacitor Co for a cycle, and therefore, the primary current Ip is switched on once more. Actually, the secondary current Is was not switched on and as a result, the primary current Ip will continuously increase, finally causing the transformer 14 to go into magnetic saturation and accordingly to fail to accomplish magnetic energy transformation.

To remove the noise interference, it has proposed to introduce a constant delay time (CDT) after the primary current Ip is switched off, as shown in FIG. 5, in which waveform 50 represents the control signal S1, waveform 52 represents the primary current Ip, waveform 54 represents the secondary current Is, and waveform 56 represents the CDT. With the insertion of the CDT before the switch-back current detector is enabled, the controller chip 14 is delayed for a time period CDT to detect the secondary current Is after the primary current Ip is switched off, and the interference of the noise 58 is prevented. However, it is hard for a circuit designer to determine a suitable CDT, since the duration of the noise 58 is sensitive to induced current, transformer size, parasitic capacitor and PCB layout.

Therefore, it is desired a control circuit and method for a fly-back voltage converter to avoid the noise interference without CDT technique.

SUMMARY OF THE INVENTION

An object of the present invention is to provide a control circuit and method for a fly-back voltage converter.

In a fly-back voltage converter that includes a transformer to transform a primary current into a secondary current and a switch serially coupled to the primary winding to switch the primary current in response to a control signal, a control circuit and method control the off-time of the switch by use of a hysteretic threshold to detect the secondary current. A detection signal is produced by comparing a detected secondary current with two threshold values to trigger the next on-time cycle. After the primary current is switched off, once the detected secondary current is greater than a first threshold value, the detection signal indicates that the secondary current has been switched on, and until the detected secondary current falls down to be lower than a second threshold value, the detection signal indicates that the secondary current is to be switched off.

In the hysteretic threshold, two threshold values are used to be compared with the detected secondary current to determine if the secondary current has completed a cycle. It is therefore a robust method to detect the secondary current in a fly-back voltage converter. Only when the noise before the secondary current is switched on has a maximum value greater than the first threshold value, misjudgment by the control circuit and method and accordingly error operation in the converter may occur. The method is insensitive to induced current, transformer size, parasitic capacitor, PCB layout and any other parasitic parameters.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
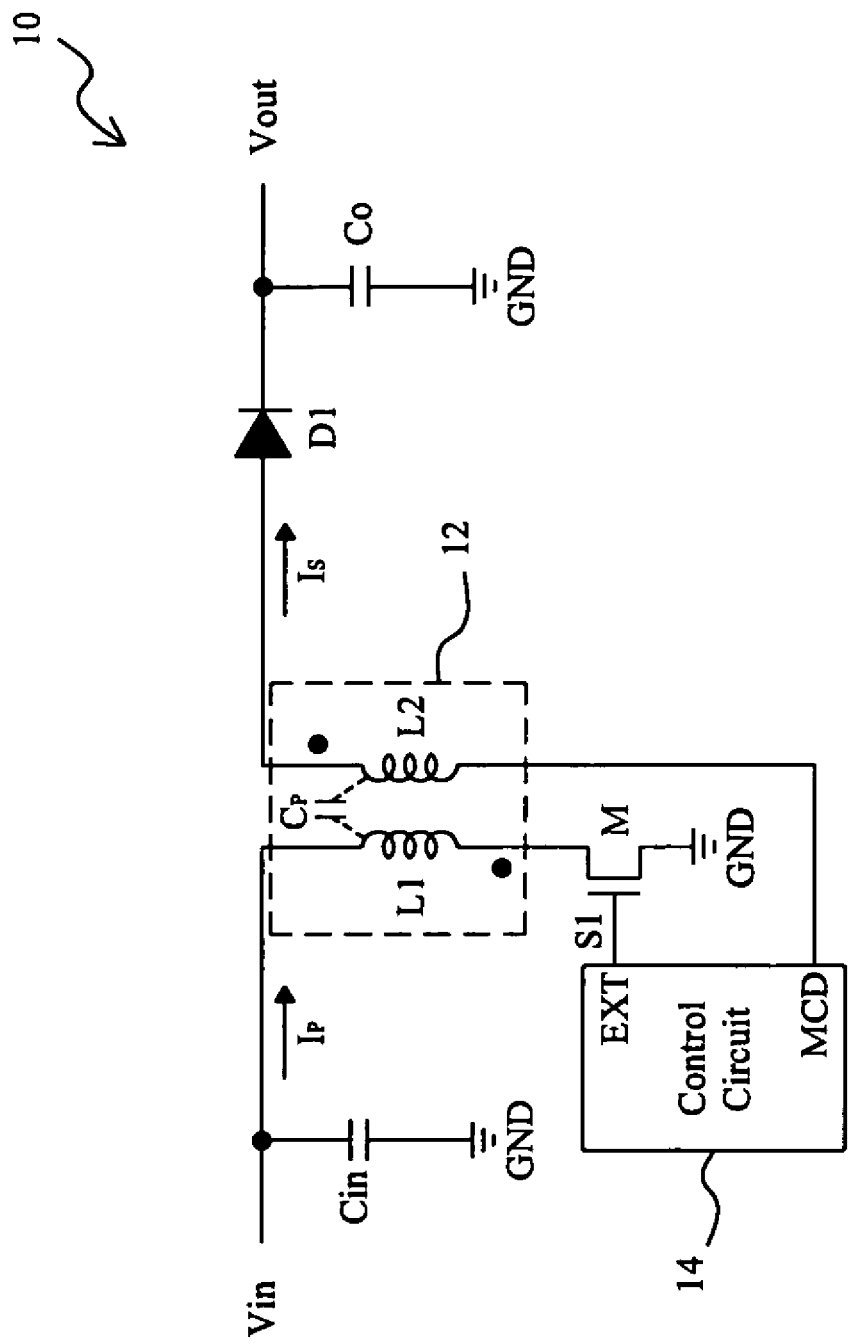
FIG. 1 shows a circuit diagram of a conventional fly-back voltage converter.
Figure 2:
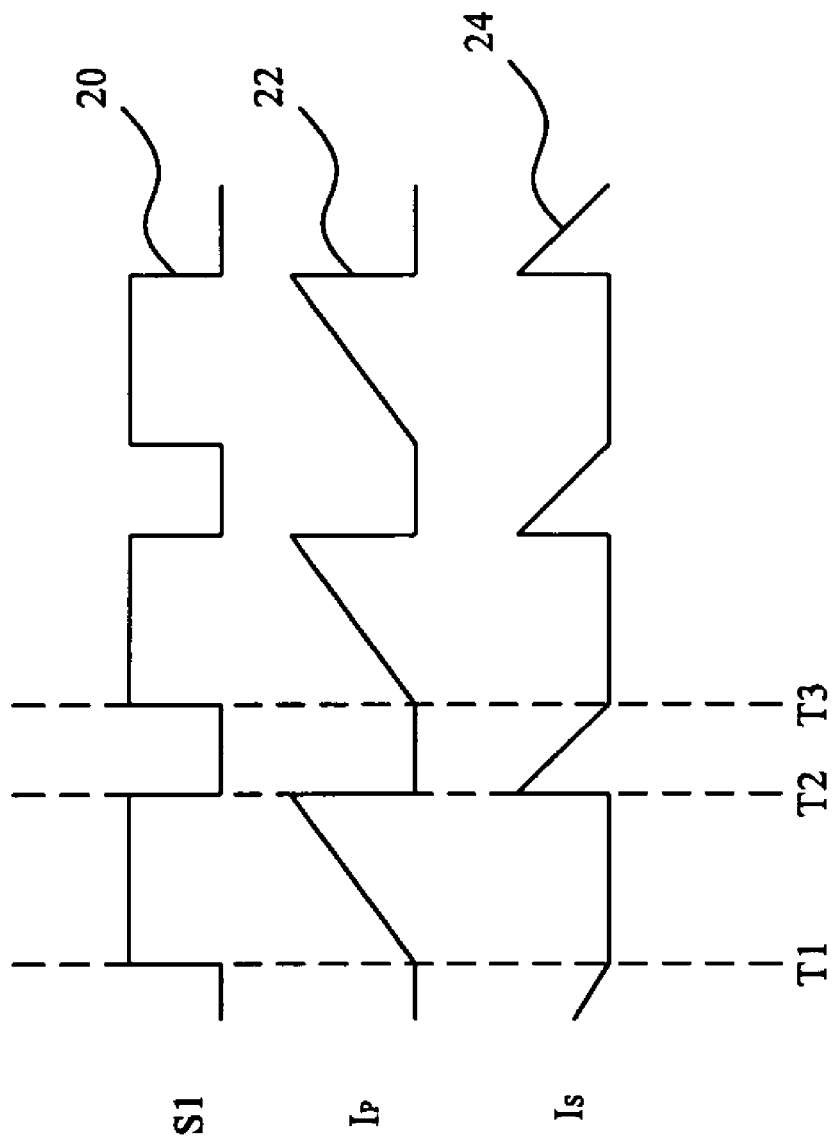
FIG. 2 shows ideal waveforms of the control signal, primary current, and secondary current in the converter of FIG. 1.
Figure 3:
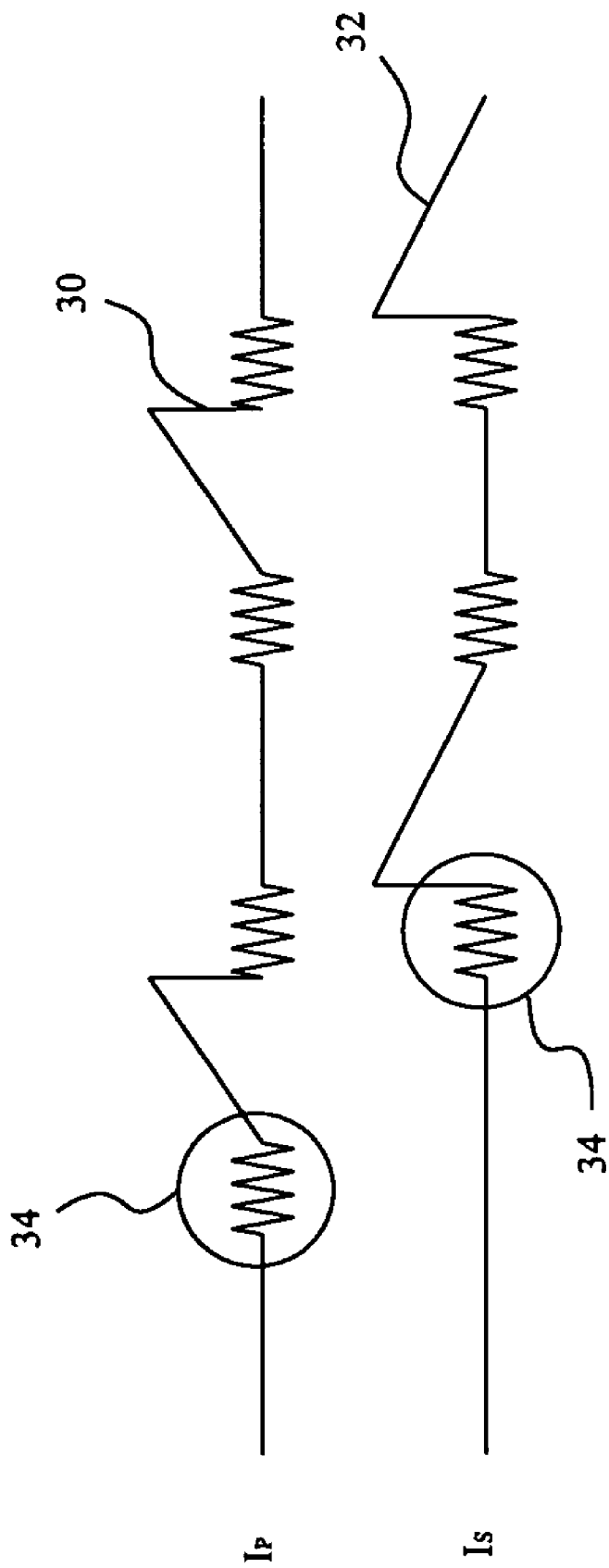
FIG. 3 schematically shows actual waveforms of the primary current and secondary current in the converter of FIG. 1.
Figure 4:
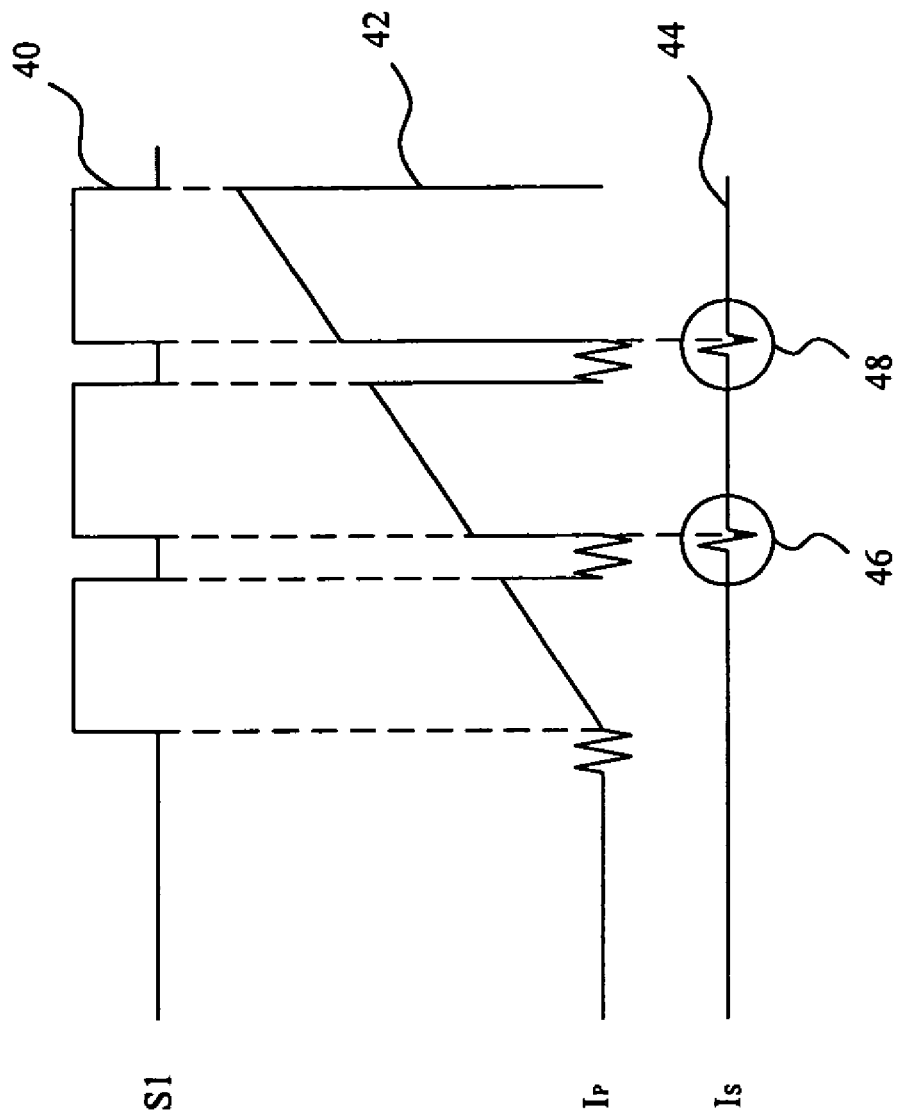
FIG. 4 shows a waveform diagram when noises induce error operations in the converter of FIG. 1.
Figure 5:
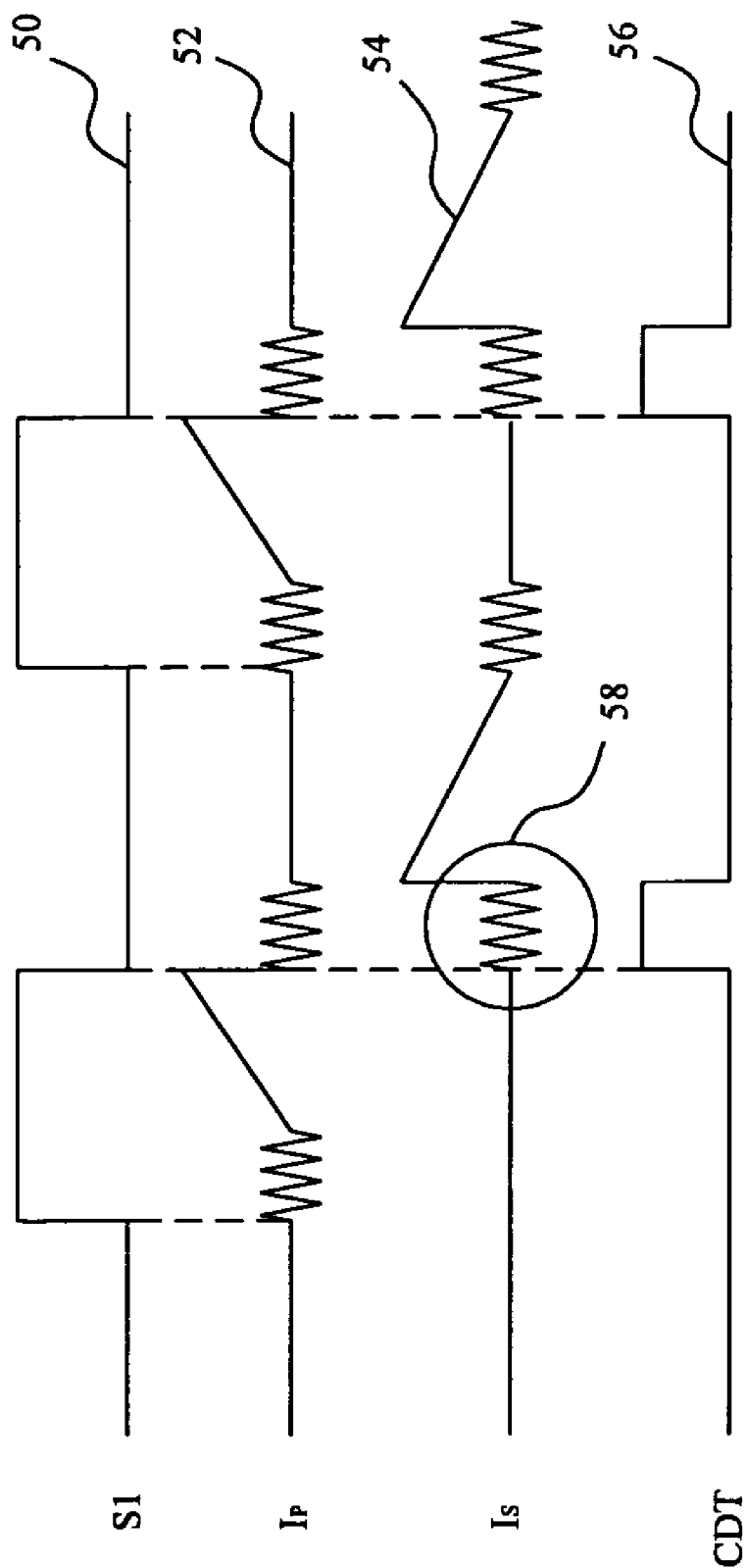
FIG. 5 shows a waveform diagram when a CDT technique is employed in the converter of FIG. 1 to remove noise interference therefrom.
Figure 6:
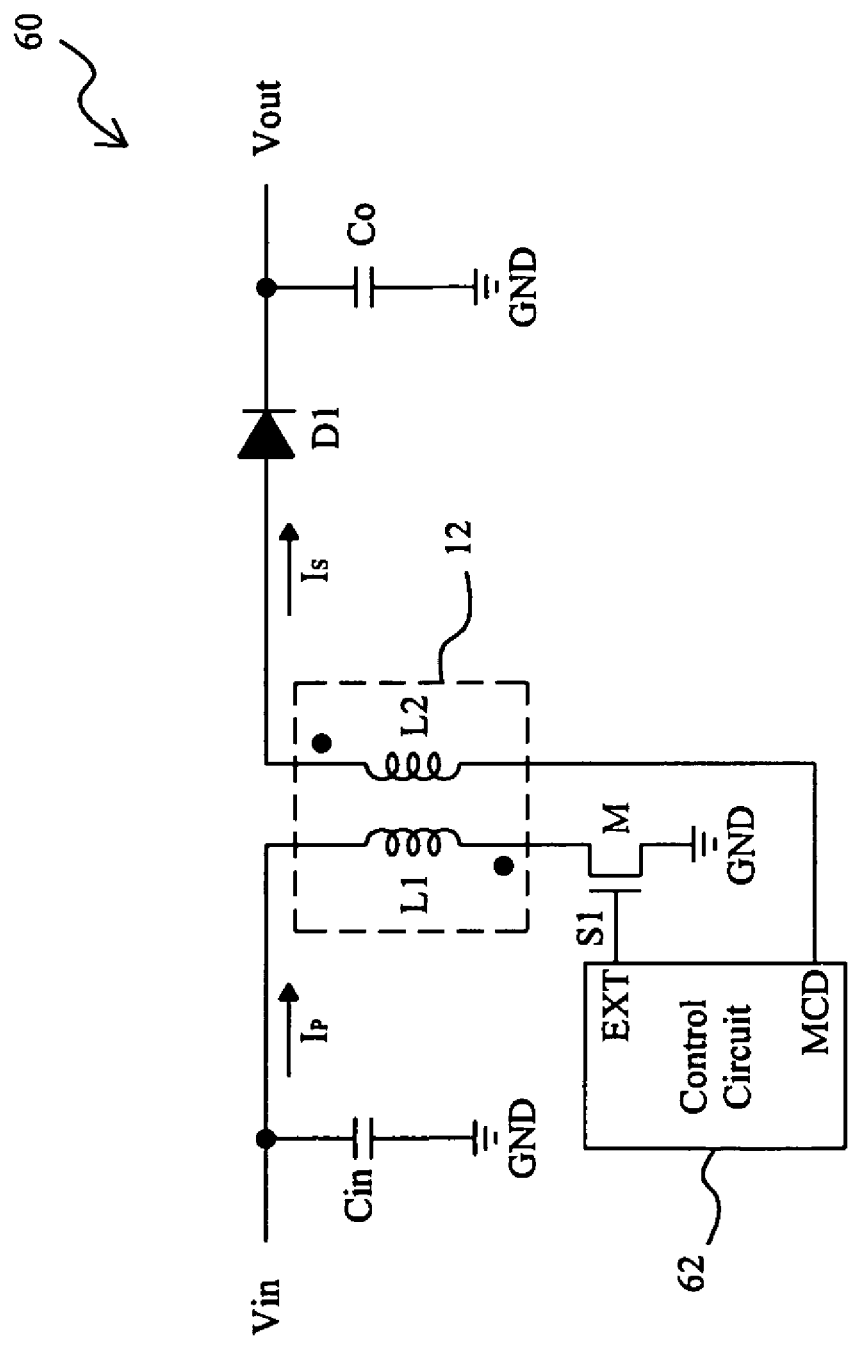
FIG. 6 shows a circuit diagram of a fly-back voltage converter using a control circuit and method according to the present invention.

FIG. 6 shows a circuit diagram of a fly-back voltage converter 60 using a control circuit and method according to the present invention. In the fly-back voltage converter 60, a transformer 12 has a primary winding L1 coupled between an input voltage Vin and a switch M and a secondary winding L2 coupled between a capacitor Co and a controller chip 62, and the controller chip 62 has an output pin EXT to provide a control signal S1 to switch the switch M, so as to transform a primary current Ip in the primary winding L1 into a secondary current Is in the secondary winding L2 to charge the capacitor Co to thereby produce an output voltage Vout, and a detection pin MCD coupled to the secondary winding L2 to detect the secondary current Is. The controller chip 62 includes a control circuit to determine the control signal S1, by which the secondary current Is is detected to control the off-time of the switch M. In further detail, after the primary current Ip is switched off, once the secondary current Is is detected to be greater than a first threshold value, it is indicated that the secondary current Is has been switched on, and until the secondary current Is falls down to be lower than a second threshold value, it is indicated that the secondary current Is is to be switched off. As such, the control circuit determines that the secondary current Is has completed a cycle. If the threshold values to be compared with the detected secondary current Is are selected such that the maximum of the noise before the secondary current Is is switched on is less than the first threshold value, the noise would never cause the control circuit to misjudge that the secondary current Is has been switched on, and error operations will not be resulted therefrom.

Figure 7:
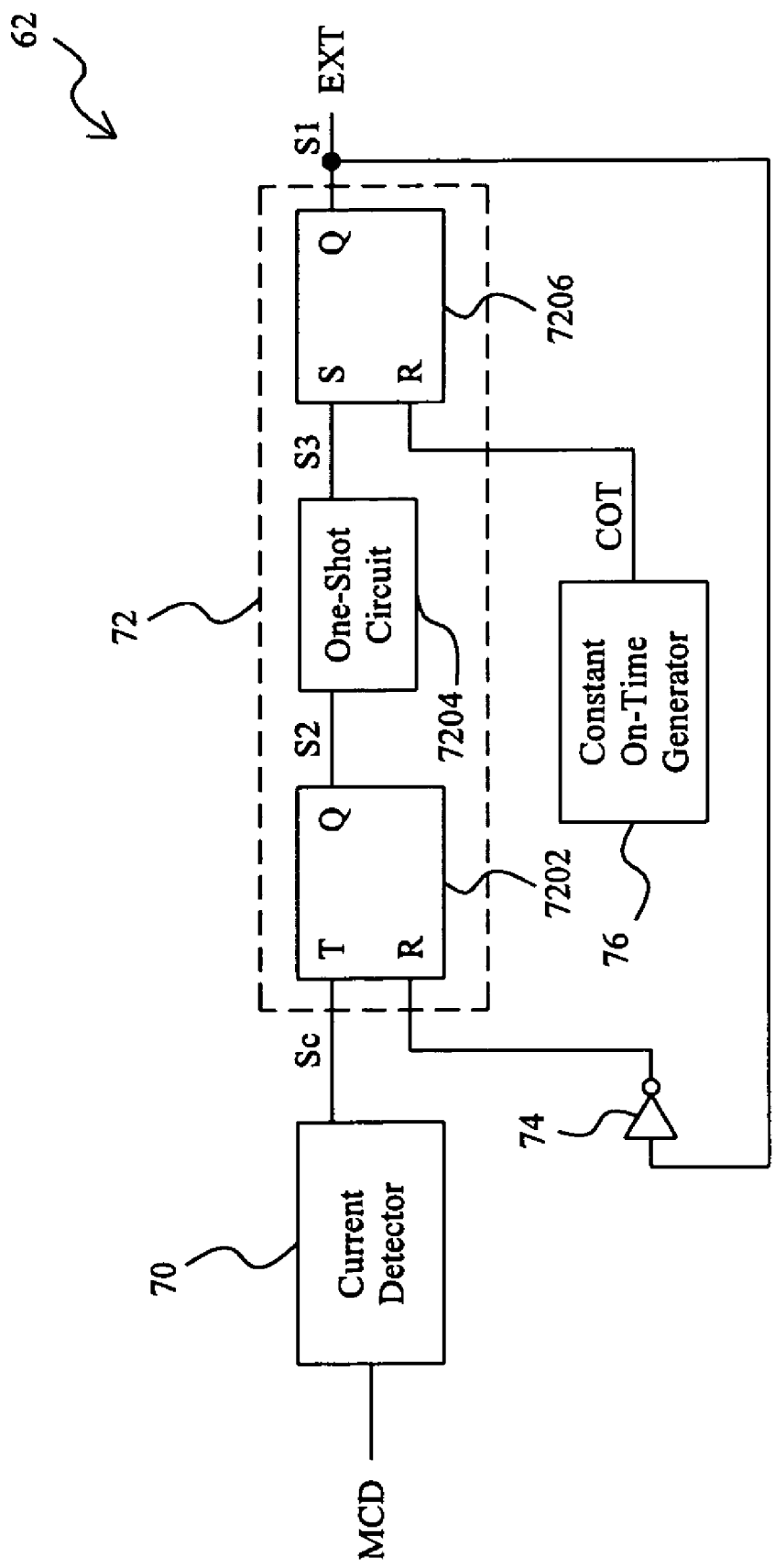
FIG. 7 shows a control circuit for a fly-back voltage converter according to the present invention.
Figure 8:
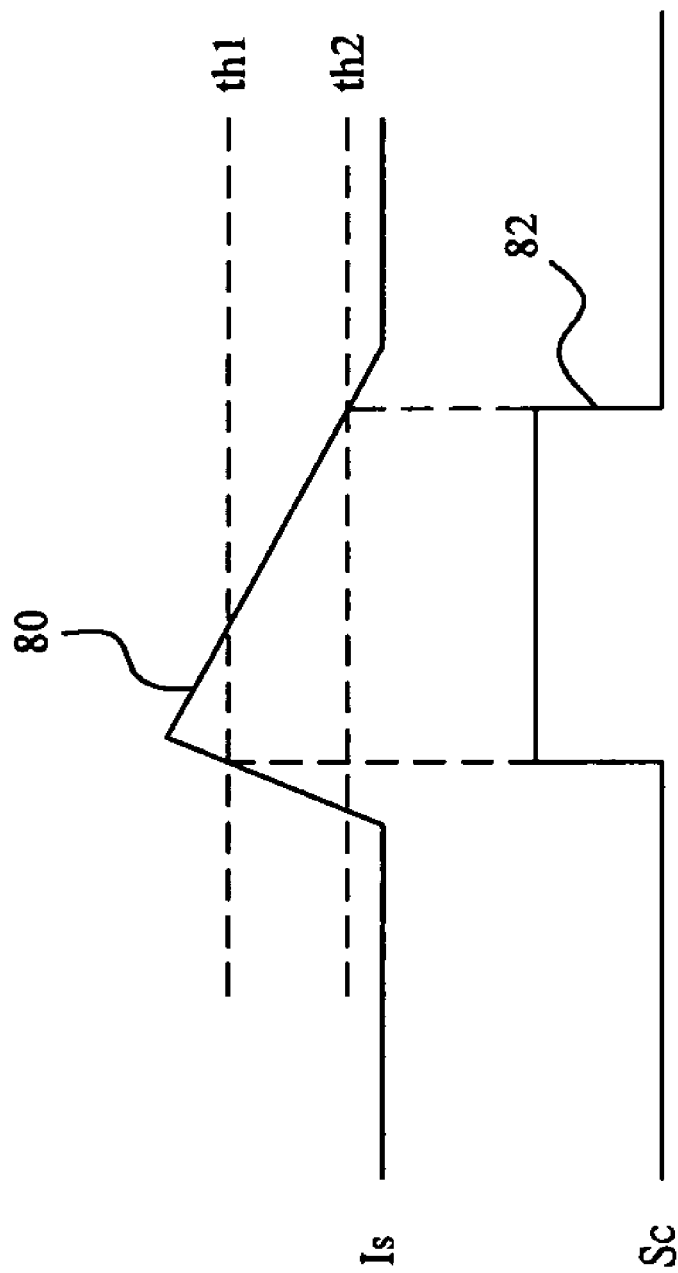
FIG. 8 shows a waveform diagram of the detection signal and secondary current when the converter of FIG. 6 employs the control circuit of FIG. 7.

FIG. 7 shows a control circuit in the controller chip 62 according to the present invention, in which a current detector 70 detects the secondary current Is from the detection pin MCD of the controller chip 62 to produce a detection signal Sc to indicate that if the secondary current Is has been switched on and if the secondary current Is is to be switched off. The current detector 70 is preset with two threshold values th1 and th2 to determine the detection signal Sc. After the primary current Ip is switched off, once the secondary current Is is detected to be greater than the first threshold value th1, the detection signal Sc will be at a first state indicating that the secondary current Is has been switched on, and until the secondary current Is is detected to be lower than the second threshold value th2, the detection signal Sc will be at a second state indicating that the secondary current Is is to be switched off. For example, FIG. 8 shows a waveform diagram of the secondary current Is and detection signal Sc, in which waveform 80 represents the secondary current Is and waveform 82 represents the detection signal Sc. A hysteresis range is used in the current detector 70 to prevent from error detection. After the primary current Ip is switched off, the secondary current Is begins to increase rapidly, and when it reaches the first threshold th1, the detection signal Sc transits to logical high to indicate that the secondary current Is has been switched on. Thereafter, until the secondary current Is falls down to the secondary threshold value th2, the detection signal Sc transits to logical low, which indicates that the secondary current Is is to be switched off. Referring back to FIG. 7, a control signal generator 72 determines the control signal S1 to switch the switch M based on the detection signal Sc, an inverted control signal /S1 provided by an inverter 74, and a constant on-time signal COT produced by a constant on-time generator 76. In the control signal generator 72, a T flip-flop 7202 has two inputs T and R connected with the detection signal Sc and inverted control signal /S1 to produce a signal S2 at its output Q, a one-shot circuit 7204 produces a pulse signal S3 in response to the signal S2, and an SR flip-flop 7206 has two inputs S and R connected with the pulse signal S3 and constant on-time signal COT to produce the control signal S1 at its output Q. In the control, the next on-time cycle of the switch M is triggered by the current detector 70 in association with the T flip-flop 7202. In this embodiment, the threshold values th1 and th2 to determine that if the secondary current Is has been switched on and if the secondary current Is is to be switched off are preset in the current detector 70; while in other embodiments, they may be preset by other circuits instead.

Figure 9:
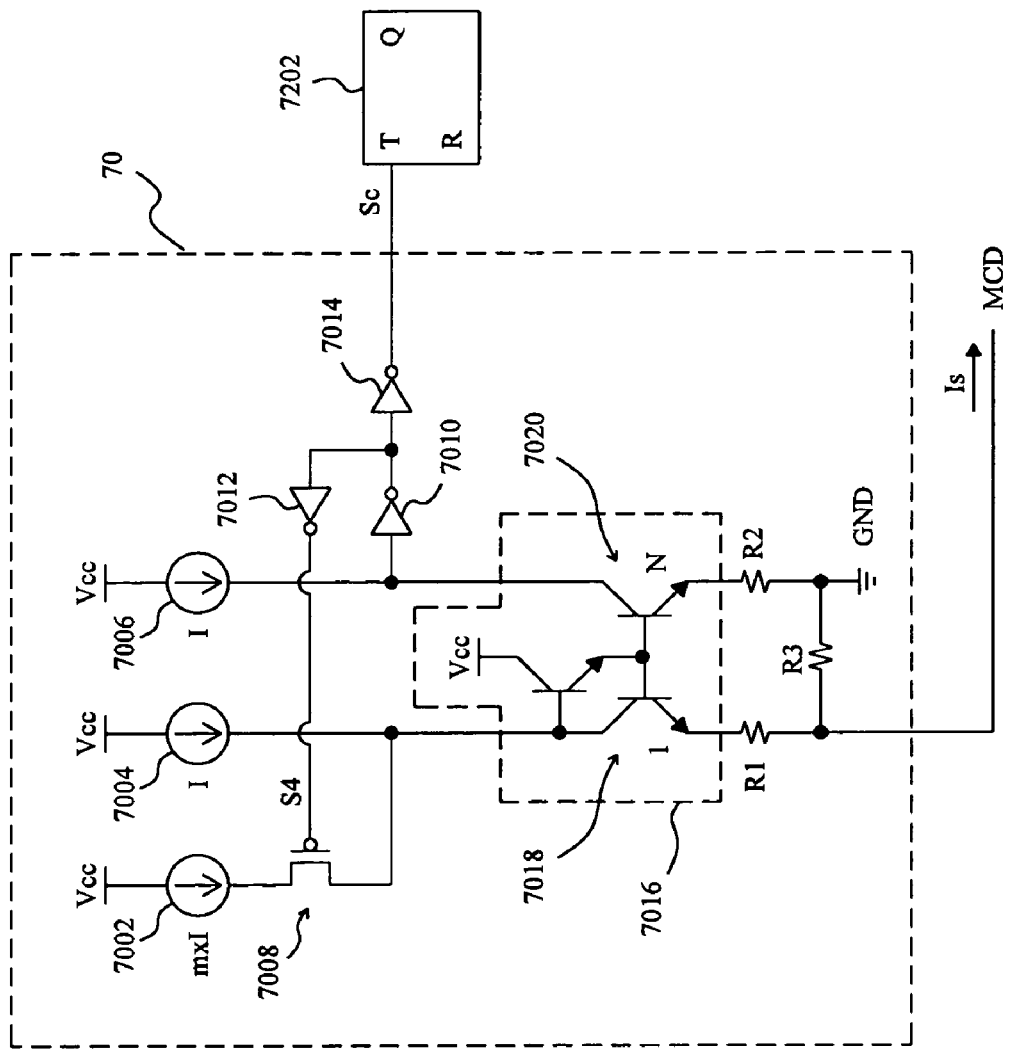
FIG. 9 shows an embodiment circuit for the current detector shown in FIG. 7.

For the current detector 70, FIG. 9 shows an embodiment circuit including a current comparator with adjustable hysteresis, in which a current mirror 7016 includes a reference branch having a transistor 7018 and a mirror branch having a transistor 7020. The transistor 7018 has a collector coupled with two current sources 7002 and 7004, and an emitter coupled to the detection pin MCD through a resistor R1 and to ground GND through the resistor R1 and a resistor R3. The transistor 7020 has a collector coupled with a current source 7006 and an emitter coupled to the detection pin MCD through a resistor R2 and the resistor R3 and to ground GND through the resistor R2. Moreover, the transistors 7018 and 7020 have a size ratio of 1:N, where N is an integer. The detection signal Sc coupled to the input T of the T flip-flop 7202 is produced from the voltage on the collector of the transistor 7020 through two inverters 7010 and 7014. On the other hand, a transistor 7008 is coupled between the current source 7002 and the reference branch of the current mirror 7016, and has a gate coupled with a signal S4 produced from the voltage on the collector of the transistor 7020 through two inverters 7010 and 7012. Referring to FIGS. 6, 8 and 9, before the primary current Ip is switched off, the secondary current Is is substantially zero, and thus the voltage on the collector of the transistor 7020 in the current detector 70 is at low level. As a result, the signal S4 and detection signal Sc are both logical low. The transistor 7008 is a PMOS, and hence it is turned on by the signal S4 to supply the current of m×I from the current source 7002 to the reference branch of the current mirror 7016, thereby determining the threshold value $$th1 = \frac{VT\ln((m+1) \times N)}{R3}$$

where m is constant and VT is the thermal voltage (KT/q). After the primary current Ip is switched off, the secondary current Is begins increasing, and when the secondary current Is reaches the threshold value th1, it is indicated that the secondary current Is has been switched on, and the voltage on the collector of the transistor 7020 in the current detector 70 transits to high level, causing the signal S4 and detection signal Sc to transit to logical high. As a result, the PMOS transistor 7008 is turned off by the signal S4, so that the current source 7002 stops providing current to the reference branch of the current mirror 7016, thereby determining the threshold value $$th2 = \frac{VT\ln(N)}{R3}$$

Once the secondary current Is falls down to the threshold value th2, it is indicated that the secondary current Is is to be switched off, and the voltage on the collector of the transistor 7020 in the current detector 70 transits back to low level again, causing the signal S4 and detection signal Sc to transit to logical low once more. Thus, the PMOS transistor 7008 is turned on again to supply the current m×I from the current source 7002 to the reference branch of the current mirror 7016, and the threshold value of the current detector 70 is switched to th1 once more. The above operations are repeated to charge the capacitor Co. In this embodiment, the threshold values th1 and th2 can be adjusted by changing the parameters m, N and R3.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A control circuit for a fly-back voltage converter that includes a transformer to transform a primary current in a primary winding into a secondary current in a secondary winding thereof and a switch serially coupled to the primary winding to switch the primary current in response to a control signal, the control circuit comprising:
    a current detector for detecting the secondary current to produce a detection signal having two states, the detection signal being in a first state while the primary current is switched on and the secondary current is switched off and being in a second state after the secondary current has been switched on, the current detector including a circuit for output of the detection signal initially in the first state and comparing the secondary current with a first threshold value for detecting that the secondary current has been switched on and thereby corresponding to the primary current having been switched off, the circuit outputs the detection signal in the second state responsive to the secondary current exceeding the first threshold value and compares the secondary current with a second threshold value, the circuit returning the output of the detection signal to the first state responsive to the secondary current being lower than the second threshold value to establish a completion of a cycle of the secondary current; and
    a control signal generator for generating the control signal responsive to the state of the detection signal establishing the completion of the secondary current cycle to then trigger a next on-time cycle for the switch.

2. The control circuit of claim 1, wherein the control signal generator comprises:
    a first flip-flop being responsive to the state of detection signal and reset responsive to the control signal output by the control signal generator for producing a first signal;
    a one-shot circuit in response to the first signal for producing a pulse signal; and
    a second flip-flop in response to the pulse signal and a constant on-time signal for generating the control signal.

3. The control circuit of claim 2, further comprising a constant on-time generator for generating the constant on-time signal.

4. The control circuit of claim 1, wherein the circuit of the current detector comprises a current comparator for comparing the secondary current with both of the first and second threshold values.

5. The control circuit of claim 4, wherein the current comparator comprises an adjustable threshold range between the first and second threshold values.

6. A control method for a fly-back voltage converter that includes a transformer to transform a primary current in a primary winding to a secondary current in a secondary winding thereof and a switch serially coupled to the primary winding to switch the primary current in response to a control signal, the control method comprising the steps of:
    providing a single current comparator for comparing the secondary current with a first threshold value and a second threshold value;
    generating a detection signal in a first state responsive to the secondary current being below the first threshold value;
    generating the detection signal in a second state responsive to the secondary current exceeding the first threshold value;
    comparing the secondary current with the second threshold value responsive to the secondary current exceeding the first threshold value;
    returning the detection signal to the first state responsive to the secondary current being below the second threshold value to establish a completion of a cycle of the secondary current; and
    generating the control signal responsive to the state of the detection signal establishing the completion of the secondary current cycle to then trigger a next on-time cycle for the switch.

7. The control circuit of claim 4, wherein the comparator includes a current mirror having a first reference current source to establish the first threshold value, a second reference current source to establish the second threshold value, and a switch coupled in series with the first current reference source for disabling the first current reference source responsive to the secondary current exceeding the first threshold value.

8. A control method for a fly-back voltage converter that includes a transformer to transform a primary current in a primary winding to a secondary current in a secondary winding thereof and a switch serially coupled to the primary winding to switch the primary current in response to a control signal, the control method comprising the steps of:
    providing a single current comparator for comparing the secondary current with a first threshold value and a second threshold value, the current mirror circuit having a first reference current source to establish the first threshold value, a second reference current source to establish the second threshold value, and a switch coupled in series with the first reference current source for disabling the first reference current source responsive to the secondary current exceeding the first threshold value;

generating a detection signal in a first state responsive to the secondary current being below the first threshold value;

generating the detection signal in a second state responsive to the secondary current exceeding the first threshold value;

comparing the secondary current with the second threshold value responsive to the secondary current exceeding the first threshold value;

returning the detection signal to the first state responsive to the secondary current being below the second threshold value; and generating the control signal responsive to the state of the detection signal to trigger a next on-time cycle for the switch.

\* \* \* \* \*